(12) United States Patent
Walkowiak et al.

(10) Patent No.: US 11,192,421 B2
(45) Date of Patent: Dec. 7, 2021

(54) METHOD AND DEVICE FOR DETECTING VEHICLE TURNING

(71) Applicant: Parker-Hannifin Corporation, Cleveland, OH (US)

(72) Inventors: Chad M. Walkowiak, Richland, MI (US); Christopher G. Pollack, Portage, MI (US); Daniel Sepasi, Irvine, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 55 days.

(21) Appl. No.: 16/897,355

(22) Filed: Jun. 10, 2020

(65) Prior Publication Data

US 2021/0046797 A1 Feb. 18, 2021

Related U.S. Application Data

(60) Provisional application No. 62/887,979, filed on Aug. 16, 2019.

(51) Int. Cl.
*B60G 17/005* (2006.01)
*B60G 17/016* (2006.01)
*B60G 17/015* (2006.01)
*B60G 17/018* (2006.01)
*B60G 17/019* (2006.01)

(52) U.S. Cl.
CPC ....... *B60G 17/0162* (2013.01); *B60G 17/018* (2013.01); *B60G 17/019* (2013.01); *B60G 17/0155* (2013.01); *B60G 2400/0511* (2013.01); *B60G 2400/252* (2013.01); *B60G 2400/5122* (2013.01); *B60G 2600/604* (2013.01); *B60G 2800/914* (2013.01)

(58) Field of Classification Search
CPC ........... B60G 17/0162; B60G 17/0155; B60G 17/018; B60G 17/019; B60G 2400/0511; B60G 2400/252; B60G 2400/5122; B60G 2600/604; B60G 2800/914
USPC ......................................... 280/5.507, 5.514
See application file for complete search history.

(56) References Cited

U.S. PATENT DOCUMENTS

| | | | |
|---|---|---|---|
| 6,168,171 B1 * | 1/2001 | Shono | B60G 17/005 280/5.507 |
| 6,845,988 B2 | 1/2005 | Romer et al. | |
| 7,552,932 B2 | 6/2009 | Matern et al. | |
| 9,597,940 B2 | 3/2017 | Anderson et al. | |
| 9,908,379 B2 * | 3/2018 | Guest | B60G 17/016 |

(Continued)

FOREIGN PATENT DOCUMENTS

DE 102008034240 1/2010

OTHER PUBLICATIONS

Parker Pneumatic; "Kneeling Module Split System/High Boy;" Kneeling Module catalogue; Apr. 2007; https://www.ohiobelting.com/assets/images/PDFs/Parker-kneelingbus.pdf.

(Continued)

*Primary Examiner* — Toan C To

(74) *Attorney, Agent, or Firm* — Renner, Otto, Boisselle & Sklar, LLP

(57) ABSTRACT

A method and device utilizing pressure and/or height measurements across an axle of a vehicle to detect when the vehicle turns and, when a turn is detected, a control action is taken to avoid pneumatic pressure loss by inhibiting active leveling via the height adjustable suspension.

20 Claims, 7 Drawing Sheets

(56) References Cited

U.S. PATENT DOCUMENTS

| | | | |
|---|---|---|---|
| 2004/0254702 A1* | 12/2004 | Mueller | B62J 27/00 |
| | | | 701/38 |
| 2007/0080514 A1 | 4/2007 | Stender et al. | |
| 2009/0033055 A1 | 2/2009 | Morris et al. | |
| 2018/0029432 A1* | 2/2018 | Kondo | B60G 17/0162 |
| 2019/0359025 A1* | 11/2019 | Wager | B60G 21/073 |
| 2020/0139781 A1* | 5/2020 | Goto | B60G 17/08 |
| 2020/0262477 A1* | 8/2020 | Hirao | B60G 17/0195 |

OTHER PUBLICATIONS

Parker Pneumatic; "Pneumatic Solutions for Transportation;" Parker Transportation Brochure; https://www.parker.com/Literature/Literature%20Files/pneumatic/cat/english/0600-B75-Transportation.pdf.

\* cited by examiner

METHOD AND DEVICE FOR DETECTING VEHICLE TURNING

RELATED APPLICATIONS

This application claims the benefit of 62/887,979 filed on Aug. 16, 2019. Which is herein incorporated by reference in its entirety.

TECHNICAL FIELD

The present disclosure relates generally to vehicle suspensions and in particular to height adjustable suspensions.

BACKGROUND

Vehicles often utilize height adjustable suspensions to vary the ride height or ground clearance of the vehicle. For example, transit buses often include an air suspension powered by an electric or engine-driven air pump or compressor. The compressor pumps air into a flexible bellows, inflating the bellows, and raising the bus chassis from the axle. The air suspension may also release air from the bellow, lowering the bus chassis from the axle.

While driving, a transit bus having a height adjustable suspension will increase or decrease air in different bellows to raise or lower different sides of the bus to maintain the height of the passengers riding in the bus. The amount of time that the compressor is used to alter the air pressure in the bellow is a primary factor in the lifetime of air suspensions.

One factor in the operation of the compressor is the overcorrection for height changes due of the bus changing. For example, during a turn, the height adjustable suspension will often increase air pressure in bellows located on the outside wheels of the turn and decrease air pressure in bellows located on the inside wheels of the turn. Then, when the turn is completed, the height adjustable suspension will undue this work (i.e., decreasing air pressure in bellow located on the outside wheel of the turn and increasing air pressure in bellows located on the inside wheels of the turn).

SUMMARY

To increase the lifespan of height adjustable suspension by reducing the run time of compressors, height adjustable suspensions may utilize steering wheel encoders to detect when a turn is being performed. When a turn is detected, the height adjustable suspension may be suspended during the turn and only be made active again when the turn is completed. But, steering wheel encoders are not standard on many transit buses and installing and maintaining steering wheel encoders on transit buses is often cost prohibitive. A method is needed for detecting a turn without using a steering wheel encoder, but instead using sensors already present in the height adjustable suspension.

The present disclosure utilizes pressure and/or height measurements across an axle of a vehicle to detect when the vehicle turns and, when a turn is detected, a control action is taken to avoid pneumatic pressure loss by inhibiting active leveling via the height adjustable suspension.

The present disclosure provides a method for detecting vehicle turning using an electronic controller based on a comparison between readings from a pair of sensors located on an axle of the vehicle.

According to one aspect, there is provided a method for detecting vehicle turning using an electronic controller based on readings from a pair of sensors located on an axle of the vehicle. The method includes the electronic controller receiving from the pair of sensors a left reading and a right reading, wherein the pair of readings comprise height readings or pressure readings. The electronic controller calculates a comparison based on the left reading and the right reading. The electronic controller detects a turn when the comparison varies from a bias by greater than a threshold. The electronic controller signals when a turn is detected.

Alternatively or additionally, the pair of sensors include a pair of pressure sensors and a pair of height sensors. The received left reading comprises a left pressure reading received by the electronic controller from the pair of pressure sensors and a left height reading received by the electronic controller from the pair of height sensors. The received right reading comprises a right pressure reading received by the electronic controller from the pair of pressure sensors and a right height reading received by the electronic controller from the pair of height sensors. The calculated comparison includes: (1) a pressure comparison calculated by the electronic controller based on the left pressure reading and the right pressure reading; and a height comparison calculated by the electronic controller based on the left height reading and the right height reading. The threshold includes a pressure threshold and a height threshold. The bias includes a pressure bias and a height bias. The electronic controller detects a turn (1) when the pressure comparison varies from the pressure bias by greater than the pressure threshold or (2) when the height comparison varies from the height bias by greater than the height threshold.

Alternatively or additionally, the vehicle includes multiple axles. At least two of the axels each include a pair of sensors. For each axle of the multiple axles, the electronic controller: receives from the pair of sensors located on the axle a left reading and a right reading; calculates a comparison based on the left reading and the right reading; detects a turn when the comparison varies from the bias by greater than the threshold; and the electronic controller signals that a turn is detected when a turn is detected for any of the multiple axles.

Alternatively or additionally, the method also includes, when a bias reset signal is received, the electronic controller sets the bias based on the comparison.

Alternatively or additionally, the electronic controller repeatedly receives at a sensor frequency the left reading and the right reading. The electronic controller also repeatedly calculates the comparison at a comparison frequency. The electronic controller also repeatedly detects a turn. The method also includes, when a turn is detected for a duration of time greater than a time threshold, generating the bias reset signal.

Alternatively or additionally, the pair of sensors are part of a height adjustable suspension. The method further includes generating the bias reset signal when a change in a target height of the height adjustable suspension is received.

Alternatively or additionally, the pair of sensors are part of a height adjustable suspension. The method also includes, when the vehicle is detected as transitioning from turning to not turning, suspending adjustment of vehicle height by the height adjustable suspension for a turn transition time duration.

Alternatively or additionally, the method also includes, when the vehicle is detected as transitioning from turning to not turning, suspending detection of a turn by the electronic controller for a turn detection cool down time duration.

Alternatively or additionally, the comparison comprises a ratio between the left reading and the right reading.

Alternatively or additionally, the pair of sensors are part of a height adjustable suspension. The method further includes: (1) when the electronic controller signals that a turn is detected, suspending adjustment of vehicle height by the height adjustable suspension; and (2) when the electronic controller does not signal that a turn is detected, allowing adjustment of vehicle height by the height adjustable suspension.

Alternatively or additionally, the method also includes the electronic controller receiving a speed of the vehicle. The electronic controller detects a turn (1) when the comparison varies from the bias by greater than the threshold, and (2) when the received speed is greater than a speed threshold.

Alternatively or additionally, the method further comprises, prior to the electronic controller receiving the readings, filtering the readings.

Alternatively or additionally, the filter is a low pass filter configured to attenuate noise caused by a sampling rate of the pressure sensors and the height sensors and noise caused by vehicle dynamics.

Alternatively or additionally, an output of a steering wheel sensor is not used in the detection of a turn by the electronic controller.

Alternatively or additionally, when the readings comprise pressure readings: the electronic controller detects a left turn when a change in the pressure comparison is caused by an increase in the right pressure reading. The electronic controller also detects a right turn when a change in the pressure comparison is caused by an increase in the left pressure reading. Alternatively, when the readings comprise height readings: the electronic controller detects a left turn when a change in the height comparison is caused by a decrease in the right height reading. The electronic controller also detects a right turn when a change in the height comparison is caused by a decrease in the left height reading.

The present disclosure also provides an electronic controller for controlling a pneumatic control device based on detecting vehicle turning from readings from a pair of sensors located on an axle of the vehicle. The electronic controller is configured to: receive from the pair of sensors a left reading and a right reading and calculate a comparison based on the left reading and the right reading. The electronic controller detects a turn when the comparison varies from a bias by greater than a threshold and signals when a turn is detected.

Alternatively or additionally, the pair of sensors include a pair of pressure sensors and a pair of height sensors. The received left reading comprises a left pressure reading from the pair of pressure sensors and a left height reading from the pair of height sensors. The received right reading comprises a right pressure reading from the pair of pressure sensors and a right height reading from the pair of height sensors. The calculated comparison includes: (1) a pressure comparison calculated by the electronic controller based on the left pressure reading and the right pressure reading; and (2) a height comparison calculated by the electronic controller based on the left height reading and the right height reading. The threshold includes a pressure threshold and a height threshold. The bias includes a pressure bias and a height bias. The electronic controller detects a turn (1) when the pressure comparison varies from the pressure bias by greater than the pressure threshold or (2) when the height comparison varies from the height bias by greater than the height threshold.

Alternatively or additionally, the vehicle includes multiple axles and at least two of the axles each include a pair of sensors. For each axle of the multiple axles, the electronic controller is configured to: (1) receive from the pair of sensors located on the axle a left reading and a right reading; (2) calculate a comparison based on the left reading and the right reading; (3) detect a turn when the comparison varies from the bias by greater than the threshold; and (4) the electronic controller is further configured to signal when a turn is detected for any of the multiple axles.

Alternatively or additionally, the electronic controller further configured to receive a bias reset signal and, when the bias reset signal is received, set the bias based on the comparison.

Alternatively or additionally, the electronic controller is configured to: repeatedly receive at a sensor frequency the left reading and the right reading and repeatedly calculate the comparison at a comparison frequency. The electronic controller also repeatedly detects a turn and, when a turn is detected for a duration of time greater than a time threshold, generate the bias reset signal.

The present disclosure further provides a system for controlling vehicle suspension. The system includes an electronic controller and a height adjustable suspension including a pair of sensors. The electronic controller is configured to generate the bias reset signal when a change in a target height of the height adjustable suspension is received.

The present disclosure additionally provides a system for controlling vehicle suspension. The system includes an electronic controller and a height adjustable suspension including a pair of sensors. The electronic controller is configured to, when the vehicle is detected as transitioning from turning to not turning, cause the height adjustable suspension to suspend adjustment of vehicle height for a turn transition time duration.

Alternatively or additionally, the electronic controller is further configured to, when the electronic controller detects that the vehicle is transitioning from turning to not turning, suspending detection of a turn for a turn detection cool down time duration.

Alternatively or additionally, the comparison comprises a ratio between the left reading and the right reading.

The present disclosure also provides a system for controlling vehicle suspension. The system includes an electronic controller and a height adjustable suspension including a pair of sensors. The electronic controller is further configured to: (1) when a turn is detected, suspend adjustment of vehicle height by the height adjustable suspension; and (2) when a turn is not detected, allowing adjustment of vehicle height by the height adjustable suspension.

Alternatively or additionally, the electronic controller receives a speed of the vehicle. The electronic controller is further configured to detect a turn (1) when the comparison varies from the bias by greater than the threshold, and (2) when the received speed is greater than a speed threshold.

Alternatively or additionally, a filter configured to filter the readings prior to the electronic controller receiving the readings.

Alternatively or additionally, the filter is a low pass filter configured to attenuate noise caused by a sampling rate of the pressure sensors and the height sensors and noise caused by vehicle dynamics.

Alternatively or additionally, an output of a steering wheel sensor is not used in the detection of a turn by the electronic controller.

Alternatively or additionally, when the readings comprise pressure readings: the electronic controller detects a left turn when a change in the pressure comparison is caused by an increase in the right pressure reading. The electronic controller detects a right turn when a change in the pressure comparison is caused by an increase in the left pressure reading. When the readings comprise height readings: the electronic controller detects a left turn when a change in the height comparison is caused by a decrease in the right height reading. The electronic controller also detects a right turn when a change in the height comparison is caused by a decrease in the left height reading.

The present disclosure additionally provides a system for controlling vehicle suspension. The system includes an electronic controller and a pneumatic control unit configured to control a height adjustable suspension including a pair of sensors.

The present disclosure further provides a system for controlling vehicle suspension. The system includes an electronic controller and a height adjustable suspension including a pair of sensors.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

DETAILED DESCRIPTION

Figure 1:
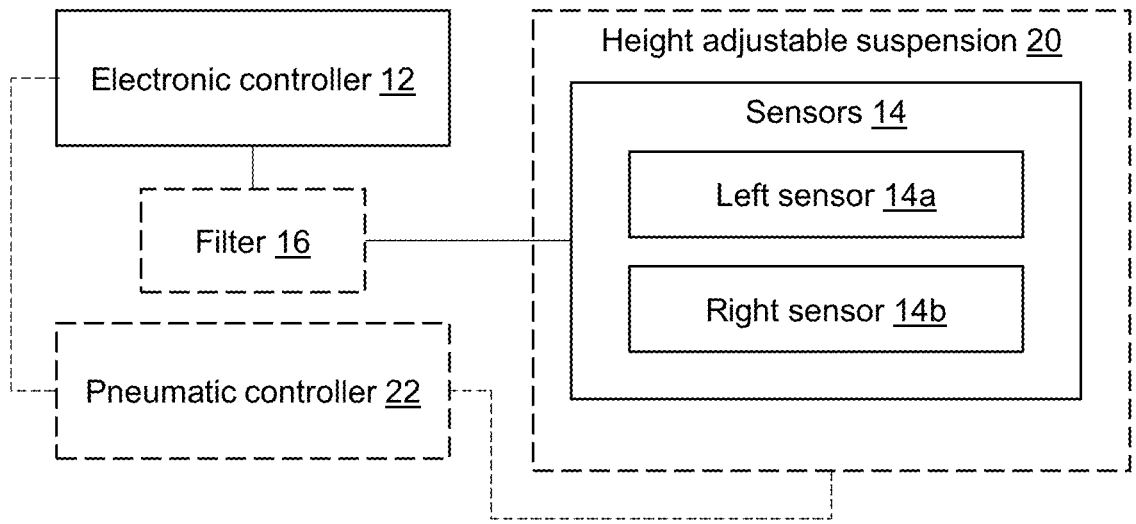
FIG. 1 is a schematic diagram of an exemplary system for controlling vehicle suspension.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

The present invention provides a method for detecting vehicle turning using an electronic controller based on a comparison between readings from a pair of sensors located on an axle of the vehicle. The electronic controller calculates a comparison based on a left and right reading from the sensors. When the comparison varies from a bias by greater than a threshold, the electronic controller signals that a turn is detected.

Figure 2:
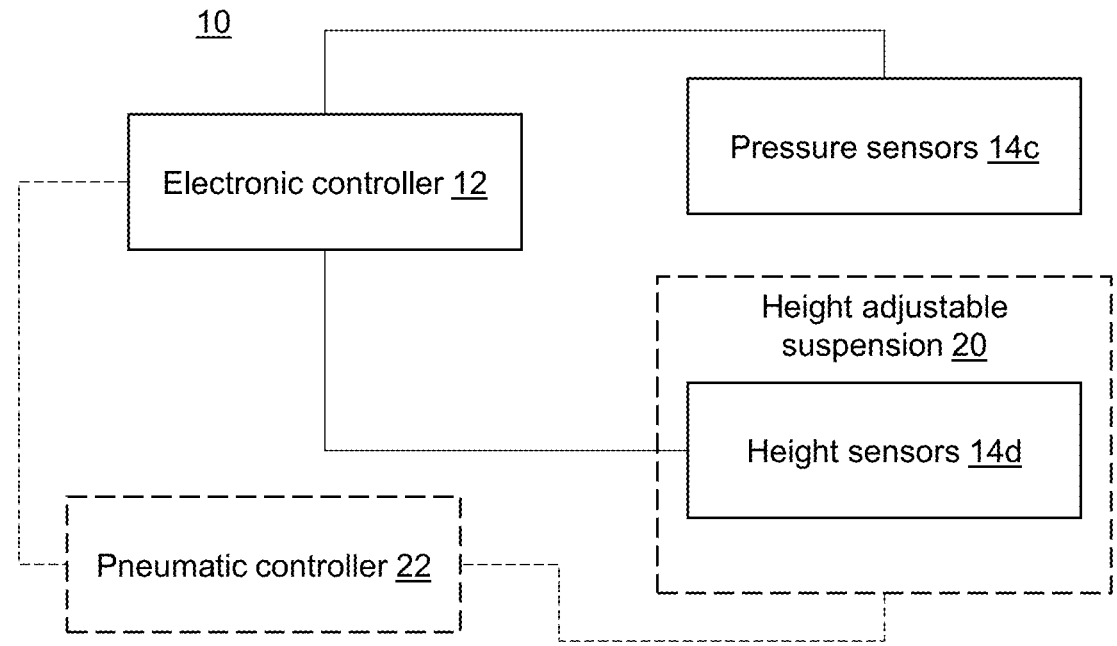
FIG. 2 is a schematic diagram of an alternative exemplary system for controlling vehicle suspension.
Figure 3:
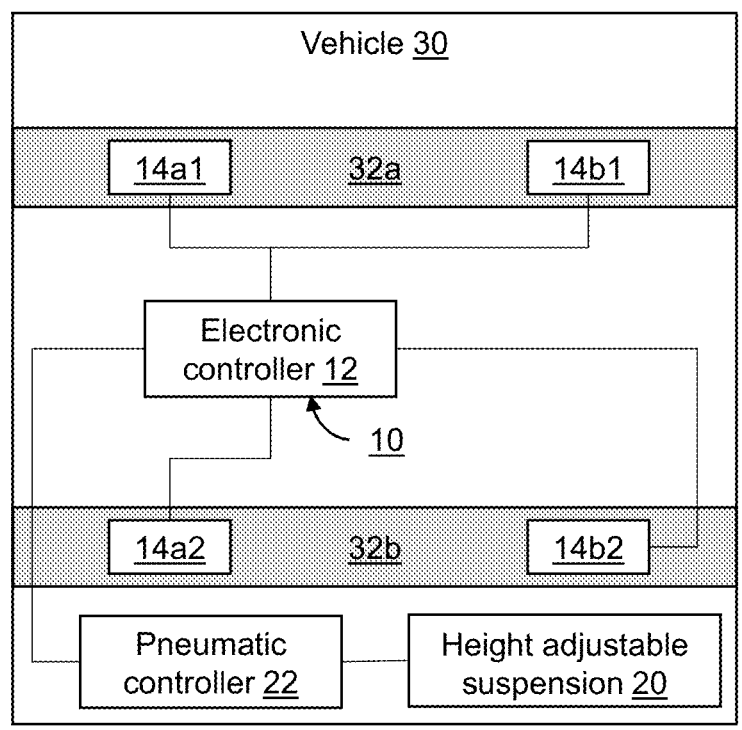
FIG. 3 is a schematic diagram of a vehicle including the system for controlling vehicle suspension.

Turning to FIGS. 1-3, an exemplary system 10 for controlling vehicle suspension based on detecting vehicle 30 turning from readings from a pair of sensors 14 located on an axle 32 of the vehicle is shown. The system 10 includes an electronic controller 12 and sensors 14. The system 10 may optionally also include a filter 14, height adjustable suspension 20, and pneumatic controller 22 (also referred to as a pneumatic control unit (PCU)). The sensors 14 include a left sensor 14a and a right sensor 14b.

The electronic controller 12 (also referred to as an electronic control unit (ECU)) controls a pneumatic control device 22 based on detecting vehicle turning from readings from a pair of sensors 14 located on an axle 32 of the vehicle 30. When the electronic controller 12 signals that a turn is detected, the height adjustable suspension may suspend adjustment of vehicle height. Conversely, when the electronic controller 12 does not signal that a turn is detected, the height adjustable suspension 20 may be allowed (i.e., enabled or permitted) to adjust vehicle height.

For example, when the electronic controller detects that the vehicle is turning, the electronic controller 12 may suspend adjustment of vehicle height by the height adjustable suspension 20. In this way, the run time of a compressor included in the height adjustable suspension 20 may be reduced by preventing the height adjustable suspension from attempting to regulate vehicle height during a turn.

The electronic controller 12 may not only suspend operation of the height adjustable suspension 20 during a turn, but, when the electronic controller 12 detects a transition from turning to not turning, the electronic controller 12 may suspend adjustment of vehicle height by the height adjustable suspension 20 for a turn transition time duration (e.g., 0.5 seconds). In this way, if the vehicle 30 continues to rock, roll, or swaying just following exiting a turn, the height adjustable suspension 20 may be prevented from attempting to compensate for this motion of the vehicle 30.

Because the vehicle 30 may rock, roll, or sway just following exiting a turn, when the vehicle 30 is detected as transitioning from turning to not turning, the electronic controller 12 may suspend detection of a turn for a turn detection cool down time duration (e.g., 1.5 seconds).

As described above, the electronic controller 12 detects a turn independent of an output of a steering wheel sensor. That is, a steering wheel sensor may not be used in the detection of a turn by the electronic controller 12. As described above, a benefit of the system 10 is the ability to detect vehicle turning without the use of steering wheel sensors (e.g., encoders) that add cost to the vehicle and require additional maintenance. The system 10 may also determine when a vehicle is turning independent of an output from an inclinometer, an accelerometer, a gyroscope, or a location sensor (e.g., GPS). Instead, the system 10 may detect turns based solely on pressure and/or height.

Figure 4:
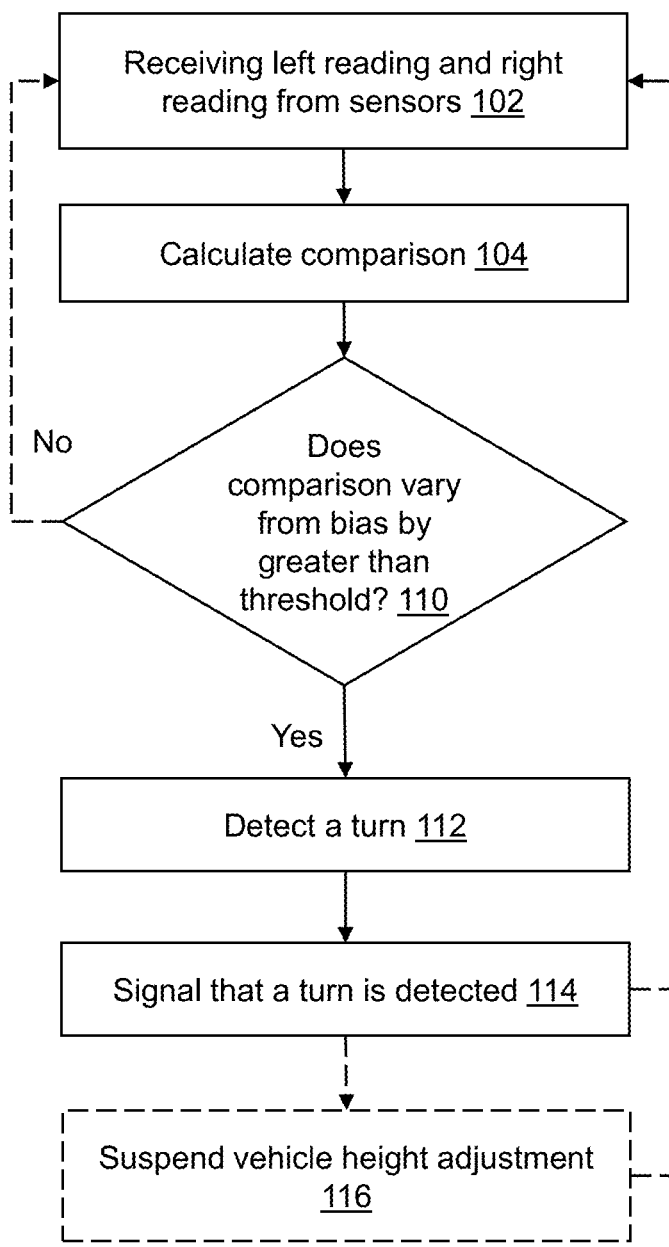
FIG. 4 is a flow diagram depicting a method for detecting vehicle turning using a left and right reading.

Turning to FIG. 4, a method 100 for detecting vehicle turning using an electronic controller based on readings from a pair of sensors located on an axle of the vehicle is shown.

In step 102, the electronic controller 12 receives from the pair of sensors a left reading and a right reading. The pair of readings include height readings or pressure readings. As shown in FIG. 1, the pair of sensors 14 may comprise a pair pressure sensors or a pair of height sensors. (As is described in further detail below, the pair of sensors 14 may include a pair of pressure sensors and a pair of height sensors.) While the sensors are shown in FIG. 3 as being located on the axles 32, the sensors 14 may instead be located separate from the axles 32. For example, pressure sensors 14 may be included as part of the pneumatic controller 22 located at a distance from the axles 32.

In step 104, the electronic controller 12 calculates a comparison based on the left reading and the right reading. The comparison may comprise a ratio between the left reading and the right reading. As will be understood by one of ordinary skill in the art, the comparison may comprise any suitable value indicative of vehicle turning (e.g., a derivative showing a rate of change of the readings with time, etc.).

In step 110, the electronic controller determines whether the comparison varies from a bias by greater than a threshold. For example, the bias may be subtracted from the comparison and the absolute value of the resulting difference may be divided by the bias. If the resulting value of the division is greater than the threshold, then a turn is detected.

When the comparison varies from a bias by greater than a threshold, the electronic controller detects a turn in step 112 and signals that a turn is detected in step 114. For example, in step 114, the electronic controller 12 may output a signal when a turn is detected. Following step 114, vehicle height adjustment may be suspended in step 116.

When the comparison does not vary from the bias by greater than a threshold in step 110, processing may optionally return to step 102. Similarly, processing may return to step 102 following step 116.

The electronic controller 12 may also detect which direction the vehicle is turning. For example, when the readings comprise pressure readings, (1) the electronic controller may detect a left turn when a change in the pressure comparison is caused by an increase in the right pressure reading and (2) the electronic controller 12 may detect a right turn when a change in the pressure comparison is caused by an increase in the left pressure reading. Similarly, when the readings comprise height readings, (1) the electronic controller may detect a left turn when a change in the height comparison is caused by a decrease in the right height reading and (2) the electronic controller may detect a right turn when a change in the height comparison is caused by a decrease in the left height reading.

Figure 5:
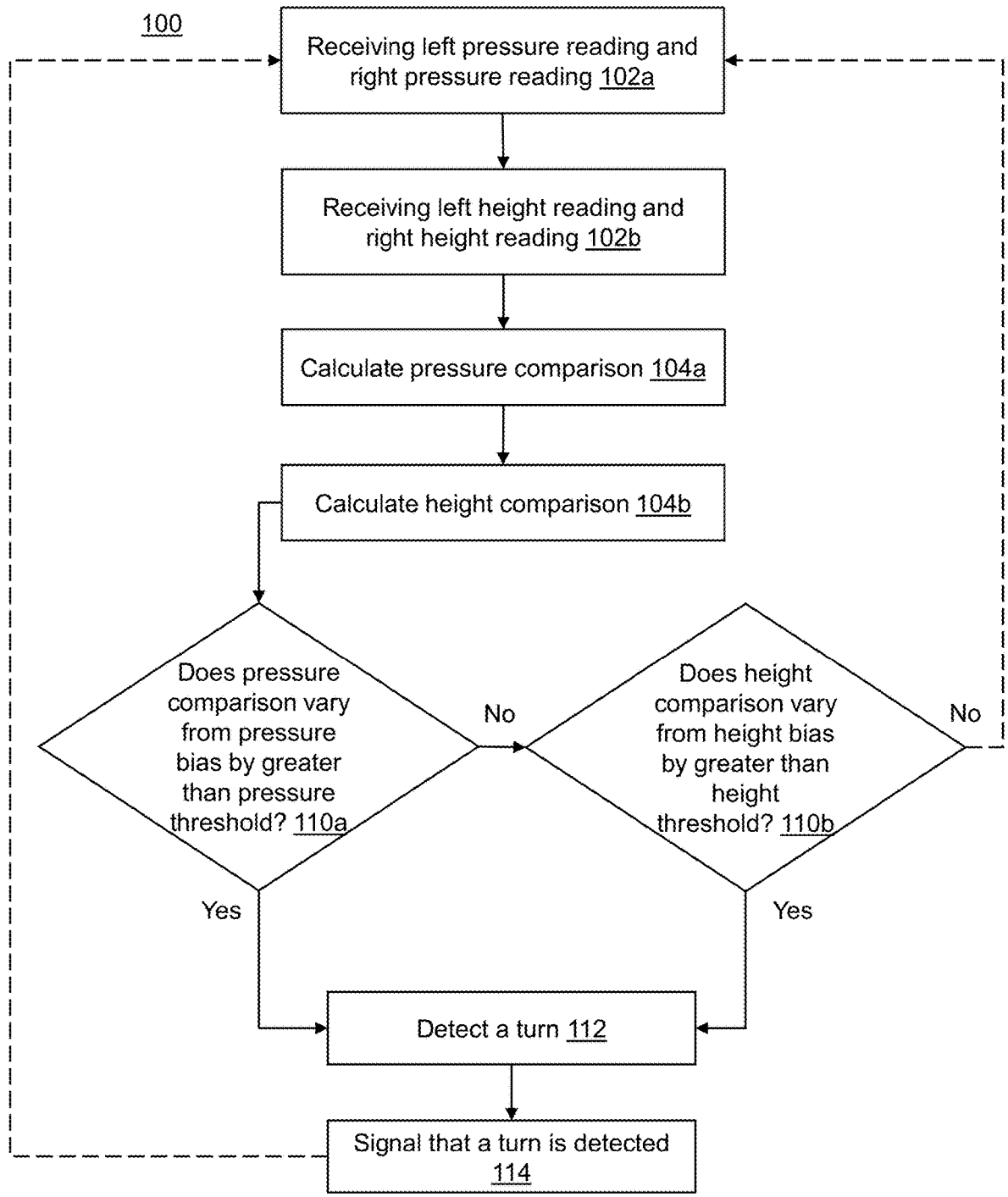
FIG. 5 is a flow diagram depicting a method for detecting vehicle turning using left and right height and pressure readings.

Turning to FIG. 5, a variation of the method 100 for detecting vehicle turning using an electronic controller based on readings from a pair of sensors located on an axle of the vehicle is shown. In step 102a and 102b of FIG. 5, the left reading comprises a left pressure reading from the pair of pressure sensors 14c and a left height reading from the pair of height sensors 14d. Similarly, the received right reading comprises a right pressure reading from the pair of pressure sensors and a right height reading from the pair of height sensors. That is, in step 102, the electronic controller 12 receives readings from both the height sensors and pressure sensors. For this reason, in step 102a, a left pressure reading and a right pressure reading is received and, in step 102b, a left height reading and a right height reading are received. For example, as shown in FIG. 2, the pair of sensors 14 may comprise a pair of pressure sensors 14c and a pair of height sensors 14d.

In step 104a and 104b of FIG. 5, the calculated comparison includes: (1) a pressure comparison calculated by the electronic controller 12 based on the left pressure reading and the right pressure reading; and (2) a height comparison calculated by the electronic controller 12 based on the left height reading and the right height reading. For this reason, in step 104a, a pressure comparison is calculated and, in step 104b, a height comparison is calculated.

In step 110a and 110b of FIG. 5, the threshold includes a pressure threshold and a height threshold and the bias includes a pressure bias and a height bias. For this reason, in step 110a, a determination is made regarding whether the pressure comparison varies from the pressure bias by greater than the pressure threshold. Similarly, in step 110b, a determination is made regarding whether the height comparison varies from the height bias by greater than the height threshold. While FIG. 5 requires a positive determination in step 110a or step 110b to detect a turn in step 112, the method 100 may be altered to require a positive determination in both step 110a and step 110b to detect a turn in step 112.

In step 112, the electronic controller 12 detects a turn (1) when the pressure comparison varies from the pressure bias by greater than the pressure threshold or (2) when the height comparison varies from the height bias by greater than the height threshold. In step 114, the electronic controller signals that a turn is detected. If a turn is not detected in steps 110a or 110b, then processing may optionally return to step 102a. Similarly, following step 114, the processing may optionally return to step 102a.

Figure 6:
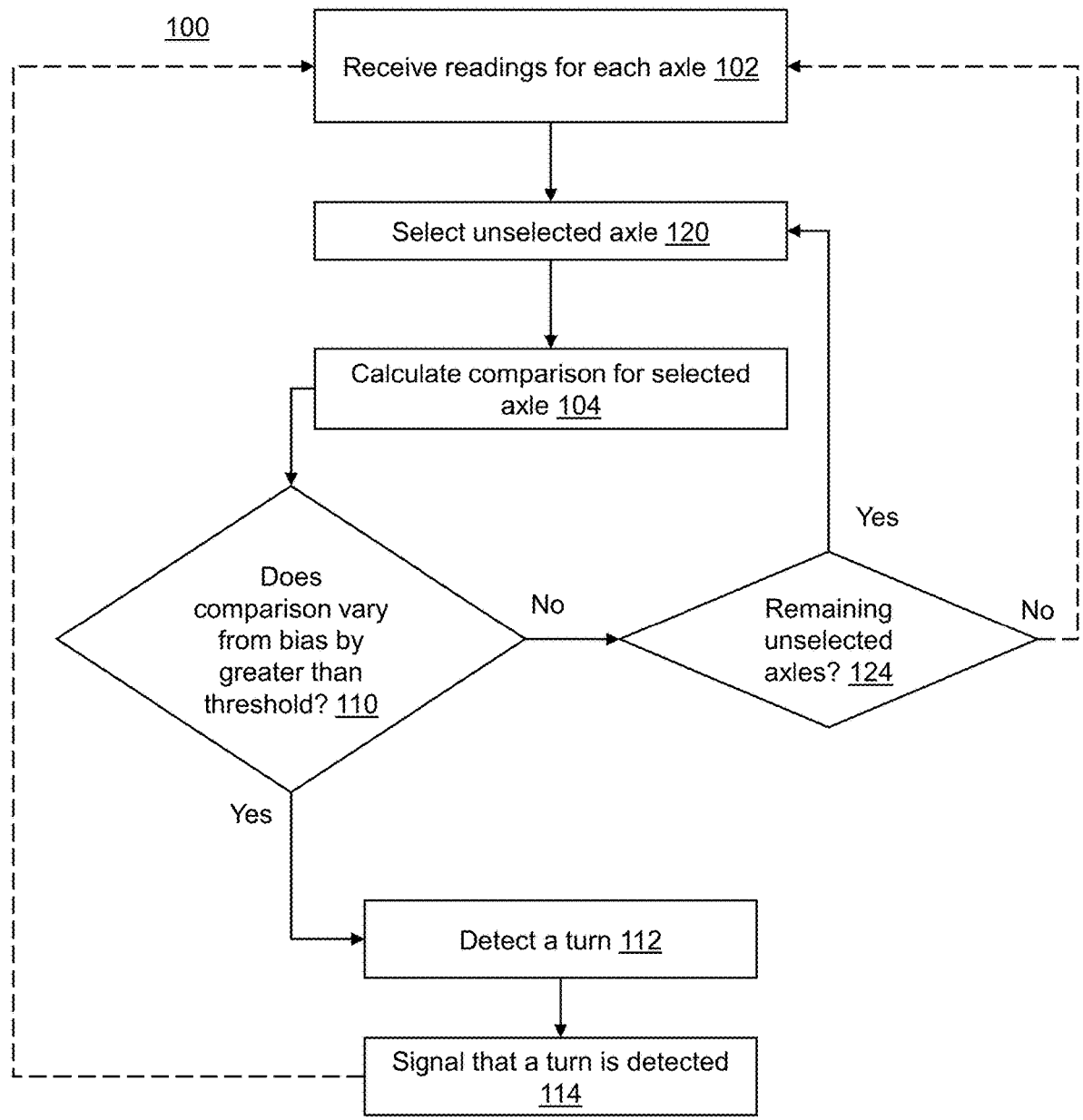
FIG. 6 is a flow diagram depicting a method for detecting vehicle turning using left and right readings from multiple axles.

As shown in FIG. 3, the vehicle 30 may include multiple axles 32a, 32b. At least two of the axels 32a, 32b may each include a pair of sensors 14a1, 14b1, 14a2, 14b2. Turning to FIG. 6, a variation of the method 100 for detecting vehicle turning using an electronic controller based on readings from pairs of sensors located on multiple axles of the vehicle is shown. In step 102, for each axle of the multiple axles 32, the electronic controller receives from the pair of sensors 14 located on the axle 32 a left reading and a right reading. In step 120, a previously unselected axle is selected. In step 104, the electronic controller 12 calculates a comparison based on the left reading and the right reading for the selected axle. In step 110, a check is performed to determine if the comparison varies from the bias by grater than the threshold.

If the determination is no in step 110, then processing moves to step 124. In step 124, a check is performed to determine if there are any remaining unselected axles. If there are any remaining unselected axles, then processing returns to step 120. If there are not any remaining unselected axles, then processing may optionally return to step 102. In this way, by performing steps 120, 104, and 110 for each axle, the electronic controller 12 determines whether a turn is detected by the multiple axles 32 of the vehicle 30.

If the determination is yes in step 110, then processing moves to step 112. In step 112, a turn is detected because the comparison varies from the bias by greater than the threshold. In step 114, the electronic controller 12 signals that a turn is detected when a turn is detected for any of the multiple axles. Following step 114, processing optionally returns to step 102. As will be understood by one of ordinary skill in the art, the method 100 may be modified so that all or a majority of the axes 32 may be required to be determined to be turning for the electronic controller 12 to signal that the vehicle is turning.

The bias used in determining when a turn is detected may be reset based on a bias reset signal. When the bias reset signal is received, the electronic controller may set the bias based on the calculated comparison. For example, the bias reset signal may alter the bias after a duration of time has passed (e.g., 3 seconds) after the bias reset signal is received. That is, once the bias reset signal is received, there may be a delay before the bias is changed.

Figure 7:
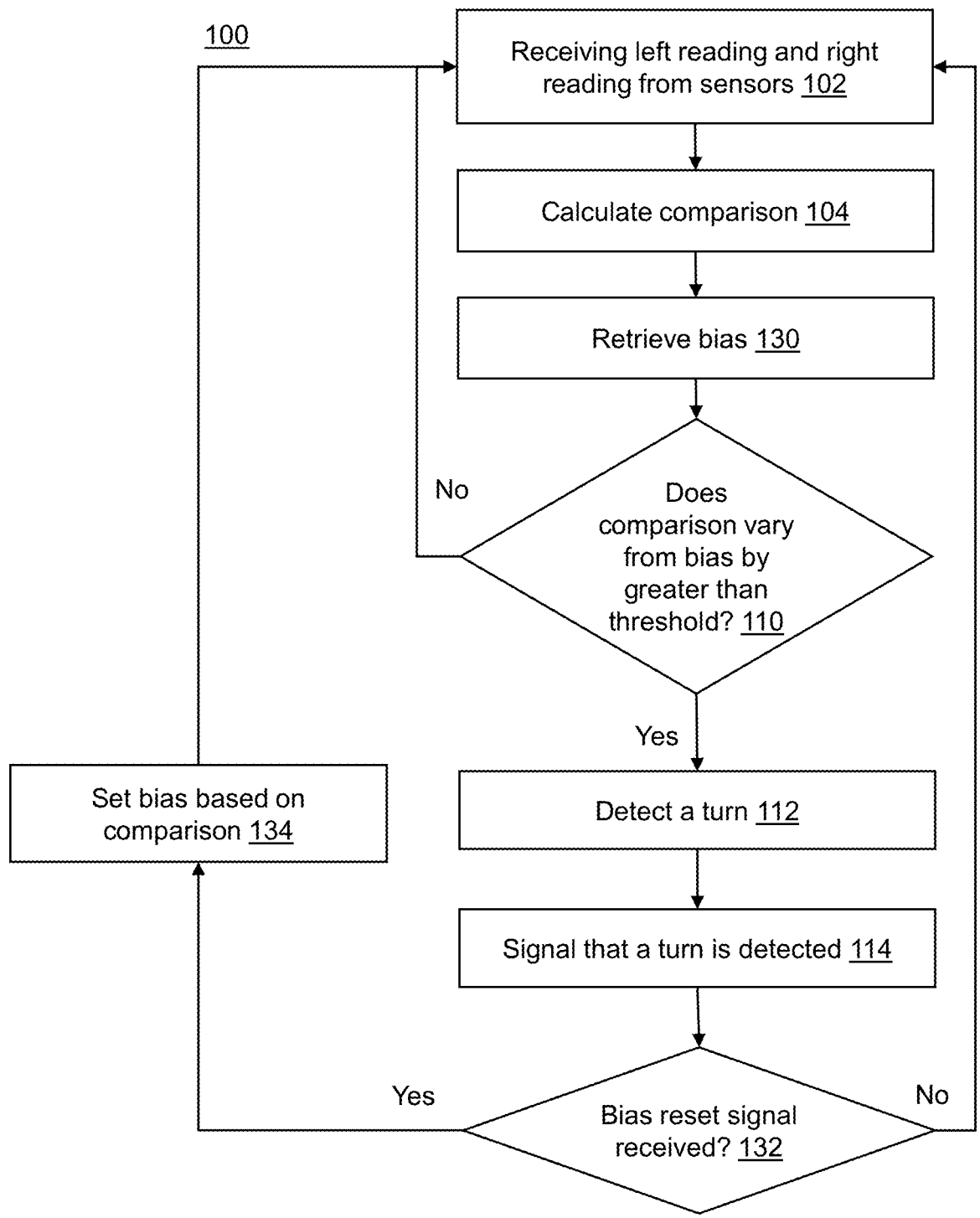
FIG. 7 is a flow diagram depicting a method for detecting vehicle turning including setting a bias used to detect the turn.

Turning to FIG. 7, an embodiment of the method 100 in which a bias reset signal is generated is shown. In step 102, the electronic controller receives the left reading and the right reading. Because processing returns to step 102, the electronic controller repeatedly receives the left reading and the right reading. The electronic controller 12 may receive the left reading and the right reading at a sensor frequency.

Following step 102, in step 104, the electronic controller 12 calculates the comparison. Because processing returns to step 102 and from step 102 to step 104, the electronic controller 12 repeatedly calculates the comparison. For example, the electronic controller 12 may calculate the comparison at a comparison frequency. As will be understood by one of ordinary skill in the art, the comparison frequency may be the same or different from the sensor frequency. For example, if the sensor outputs readings at 100 Hz, the electronic controller 12 may calculate the comparison at a reduced rate (e.g., the comparison frequency may be 10 Hz). In this example, when the comparison frequency is less than the sensor frequency, the electronic controller 12 may calculate the comparison using an average, minimum, mean, or maximum value of the received left and right readings since the comparison was previously calculated or from some other duration of time.

Following step 104, the electronic controller 12 retrieves the bias 130. For example, the electronic controller 12 may retrieve the bias from a memory accessible by the electronic controller 12. In step 110, the electronic controller determines whether the comparison varies from the bias by greater than the threshold. If the answer is no in step 110, then processing returns to step 102. Alternatively, if the answer is yes in step 110, then processing continues to step 112. In step 112, the electronic controller 12 detects a turn. Because processing returns to step 102 and from step 102 to the following steps (including step 112), the electronic controller 12 repeatedly detects a turn. In step 114, the electronic controller 12 signals that a turn is detected.

In step 132, the electronic controller 12 determines whether a bias reset signal has been received. If a bias reset signal has not been received, then processing returns to step 102. Alternatively, if a bias reset signal has been received, then processing continues to step 134. In step 134, the bias is set based on the calculated comparison. For example, the bias may be set based on (e.g., equal to) the most recently calculated comparison. Alternatively, the bias may be set based on (e.g., equal to) an average of the most recently calculated comparisons (e.g., the comparisons calculated over the previous 3 seconds or some other duration of time).

The bias reset signal may be generated for different reasons. For example, when a turn is detected for a duration of time greater than a time threshold (e.g., 20 seconds), then the bias reset signal may be generated. As another example, as the pair of sensors 14 may be part of a height adjustable suspension 20 and the bias reset signal may be generated when a change in a target height of the height adjustable suspension 20 is received.

Figure 8:
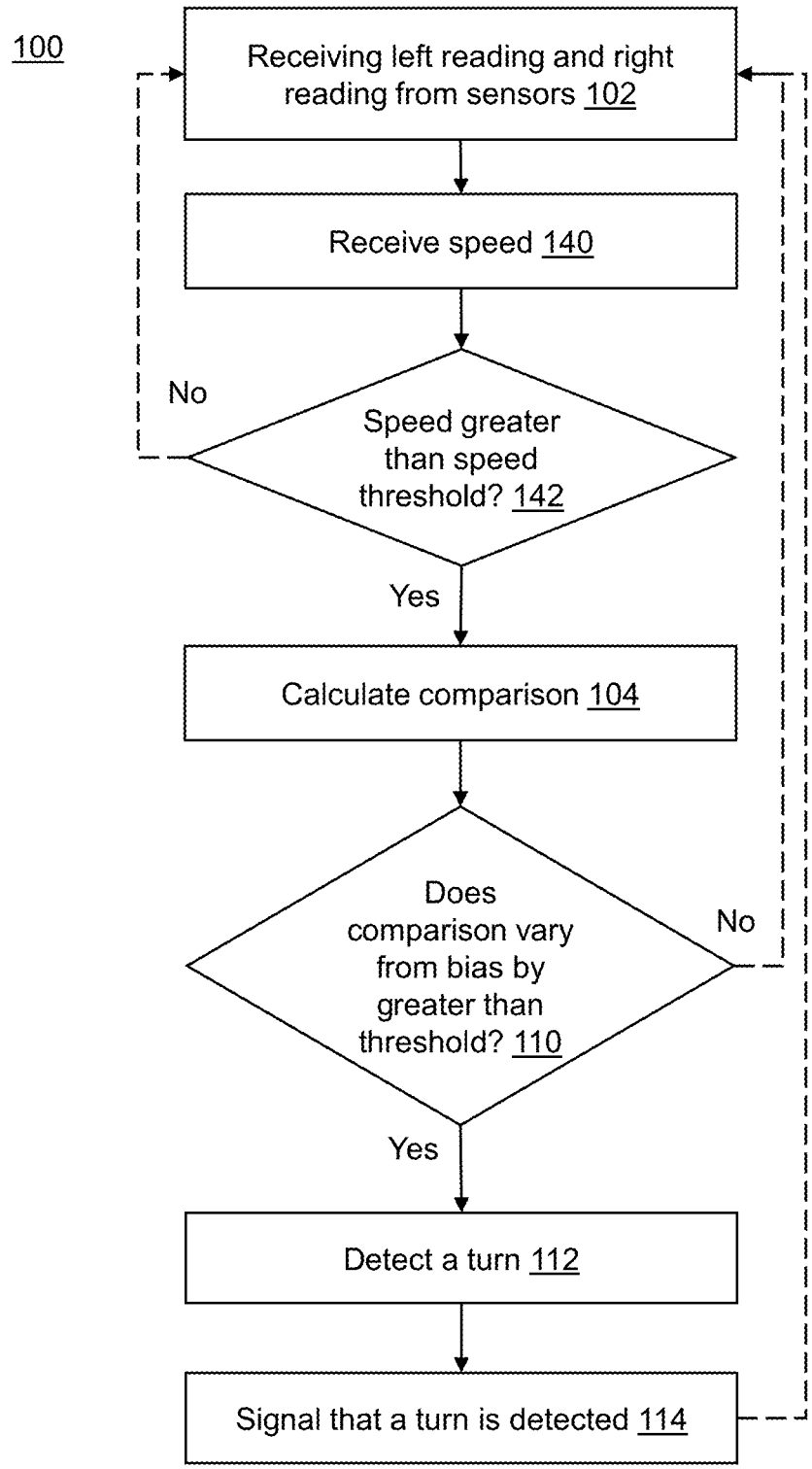
FIG. 8 is a flow diagram depicting a method for detecting vehicle turning depending on a speed of the vehicle.

Turning to FIG. 8, a variation of the method 100 is shown in which the electronic controller 12 receives a speed of the vehicle. In step 102, the electronic controller 12 receives the left reading the right reading from the sensors. In step 140, the electronic controller 12 also receives a speed of the vehicle. The speed of the vehicle may be received, e.g., from a speedometer or similar sensor located on the vehicle.

In step 142, the electronic controller 12 determines whether the received speed is greater than a speed threshold (e.g., 8 miles-per-hour). If the speed is greater than the speed threshold, then processing continues to step 104 where the comparison is calculated. Alternatively, if the speed is less than or equal to the speed threshold, then processing may return to step 102. For example, using the speed of the vehicle allows the method 100 to avoid erroneously detecting a turn when the vehicle 30 is stationary and one side of the vehicle is sitting in a depression (e.g., one wheel is positioned in a pot hole).

In step 110, a determination is made regarding whether the comparison varies from the bias by greater than the threshold. If the answer is no in step 110, then processing may return to step 102. Alternatively, if the answer is yes, then processing continues to step 112 (i.e., a turn is detected by the electronic controller 12) and step 114 (i.e., the electronic controller signals that a turn is detected).

By including step 142, the electronic controller 12 detects a turn (1) when the comparison varies from the bias by greater than the threshold, and (2) when the received speed is greater than a speed threshold. If the received speed is less than the speed threshold, then a turn may not be detected.

As will be understood by one of ordinary skill in the art, the readings from the sensors may be filtered by a filter 14 prior to the electronic controller 12 receiving the readings. The filter 14 may be a low pass filter configured to attenuate noise caused by a sampling rate of the pressure sensors and the height sensors and noise caused by vehicle dynamics (e.g., oscillation of a chassis of the vehicle 30 and bumping caused by the vehicle 30 traveling over the driving surface).

The electronic controller 12 may comprise any suitable circuitry for performing the method described above. As will be understood by one of ordinary skill in the art, the electronic controller 12 may have various implementations. For example, the electronic controller 12 may include any suitable device, such as a processor (e.g., CPU), programmable circuit, integrated circuit, memory and I/O circuits, an application specific integrated circuit, microcontroller, complex programmable logic device, other programmable circuits, or the like. The electronic controller 12 may also include a non-transitory computer readable medium, such as random access memory (RAM), a read-only memory (ROM), an erasable programmable read-only memory (EPROM or Flash memory), or any other suitable medium. Instructions for performing the method described above may be stored in the non-transitory computer readable medium and executed by the electronic controller 12. The electronic controller 12 may be communicatively coupled to a computer readable medium and communication interface through a system bus, mother board, or using any other suitable structure known in the art.

It should be appreciated that many of the elements discussed in this specification may be implemented in a hardware circuit(s), a processor executing software code or instructions which are encoded within computer readable media accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method for detecting vehicle turning using an electronic controller based on readings from a pair of sensors located on an axle of the vehicle, the method comprising:
    the electronic controller receiving from the pair of sensors a left reading and a right reading, wherein the pair of readings comprise height readings or pressure readings;
    the electronic controller calculating a comparison based on the left reading and the right reading;
    the electronic controller detecting a turn when the comparison varies from a bias by greater than a threshold; and
    the electronic controller signaling when a turn is detected.

2. The method of claim 1, wherein:
    the pair of sensors include a pair of pressure sensors and a pair of height sensors;
    the received left reading comprises a left pressure reading received by the electronic controller from the pair of pressure sensors and a left height reading received by the electronic controller from the pair of height sensors;
    the received right reading comprises a right pressure reading received by the electronic controller from the pair of pressure sensors and a right height reading received by the electronic controller from the pair of height sensors;
    the calculated comparison includes:
        a pressure comparison calculated by the electronic controller based on the left pressure reading and the right pressure reading; and
        a height comparison calculated by the electronic controller based on the left height reading and the right height reading;
    the threshold includes a pressure threshold and a height threshold;
    the bias includes a pressure bias and a height bias;
    the electronic controller detects a turn (1) when the pressure comparison varies from the pressure bias by greater than the pressure threshold or (2) when the height comparison varies from the height bias by greater than the height threshold.

3. The method of claim 1, wherein:
    the vehicle includes multiple axles;
    at least two of the axels each include a pair of sensors;
    for each axle of the multiple axles, the electronic controller:
        receives from the pair of sensors located on the axle a left reading and a right reading;
        calculates a comparison based on the left reading and the right reading;
        detects a turn when the comparison varies from the bias by greater than the threshold; and
    the electronic controller signals that a turn is detected when a turn is detected for any of the multiple axles.

4. The method of claim 1, further comprising:
    when a bias reset signal is received, the electronic controller:
        setting the bias based on the comparison.

5. The method of claim 4:
    wherein the electronic controller:
        repeatedly receives at a sensor frequency the left reading and the right reading;
        repeatedly calculates the comparison at a comparison frequency; and
        repeatedly detects a turn; and
    further comprising, when a turn is detected for a duration of time greater than a time threshold, generating the bias reset signal.

6. The method of claim 4, wherein the pair of sensors are part of a height adjustable suspension, the method further comprising generating the bias reset signal when a change in a target height of the height adjustable suspension is received.

7. The method of claim 5, wherein the pair of sensors are part of a height adjustable suspension, the method further comprising:
    when the vehicle is detected as transitioning from turning to not turning, suspending adjustment of vehicle height by the height adjustable suspension for a turn transition time duration.

8. The method of claim 5, further comprising:
    when the vehicle is detected as transitioning from turning to not turning, suspending detection of a turn by the electronic controller for a turn detection cool down time duration.

9. The method of claim 1, wherein:
    the comparison comprises a ratio between the left reading and the right reading.

10. The method of claim 1, wherein the pair of sensors are part of a height adjustable suspension, the method further comprising:
    when the electronic controller signals that a turn is detected, suspending adjustment of vehicle height by the height adjustable suspension; and
    when the electronic controller does not signal that a turn is detected, allowing adjustment of vehicle height by the height adjustable suspension.

11. The method of claim 1, further comprising the electronic controller receiving a speed of the vehicle, wherein:
    the electronic controller detects a turn (1) when the comparison varies from the bias by greater than the threshold, and (2) when the received speed is greater than a speed threshold.

12. The method of claim 1, further comprising:
    prior to the electronic controller receiving the readings, filtering the readings.

13. The method of claim 12, wherein the filter is a low pass filter configured to attenuate noise caused by a sampling rate of the pressure sensors and the height sensors and noise caused by vehicle dynamics.

14. The method of claim 1, wherein an output of a steering wheel sensor is not used in the detection of a turn by the electronic controller.

15. The method of claim 1, further comprising:
when the readings comprise pressure readings:
the electronic controller detecting a left turn when a change in the pressure comparison is caused by an increase in the right pressure reading; and
the electronic controller detecting a right turn when a change in the pressure comparison is caused by an increase in the left pressure reading; or
when the readings comprise height readings:
the electronic controller detecting a left turn when a change in the height comparison is caused by a decrease in the right height reading; and
the electronic controller detecting a right turn when a change in the height comparison is caused by a decrease in the left height reading.

16. An electronic controller for controlling a pneumatic control device based on detecting vehicle turning from readings from a pair of sensors located on an axle of the vehicle, the electronic controller configured to:
receive from the pair of sensors a left reading and a right reading;
calculate a comparison based on the left reading and the right reading;
detect a turn when the comparison varies from a bias by greater than a threshold; and
signal when a turn is detected.

17. The electronic controller of claim 16, wherein:
the pair of sensors include a pair of pressure sensors and a pair of height sensors;
the received left reading comprises a left pressure reading from the pair of pressure sensors and a left height reading from the pair of height sensors;
the received right reading comprises a right pressure reading from the pair of pressure sensors and a right height reading from the pair of height sensors;
the calculated comparison includes:
a pressure comparison calculated by the electronic controller based on the left pressure reading and the right pressure reading; and
a height comparison calculated by the electronic controller based on the left height reading and the right height reading;
the threshold includes a pressure threshold and a height threshold;
the bias includes a pressure bias and a height bias;
the electronic controller detects a turn (1) when the pressure comparison varies from the pressure bias by greater than the pressure threshold or (2) when the height comparison varies from the height bias by greater than the height threshold.

18. The electronic controller of claim 16, wherein:
the vehicle includes multiple axles;
at least two of the axels each include a pair of sensors;
for each axle of the multiple axles, the electronic controller is configured to:
receive from the pair of sensors located on the axle a left reading and a right reading;
calculate a comparison based on the left reading and the right reading;
detect a turn when the comparison varies from the bias by greater than the threshold; and
the electronic controller is further configured to signal when a turn is detected for any of the multiple axles.

19. The electronic controller of claim 15, the electronic controller further configured to:
receive a bias reset signal; and
when the bias reset signal is received, set the bias based on the comparison.

20. The electronic controller of claim 19, wherein the electronic controller is configured to:
repeatedly receive at a sensor frequency the left reading and the right reading;
repeatedly calculate the comparison at a comparison frequency; and
repeatedly detect a turn; and
when a turn is detected for a duration of time greater than a time threshold, generate the bias reset signal.

* * * * *